United States Patent
Scaife et al.

(10) Patent No.: US 10,685,114 B2
(45) Date of Patent: Jun. 16, 2020

(54) MALWARE DETECTION VIA DATA TRANSFORMATION MONITORING

(71) Applicant: University of Florida Research Foundation, Incorporated, Gainesville, FL (US)

(72) Inventors: Walter N. Scaife, Gainesville, FL (US); Patrick G. Traynor, Gainesville, FL (US); Henry Carter, Bryn Mawr, PA (US); Kevin Butler, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 188 days.

(21) Appl. No.: 15/759,014

(22) PCT Filed: Sep. 23, 2016

(86) PCT No.: PCT/US2016/053365
§ 371 (c)(1),
(2) Date: Mar. 9, 2018

(87) PCT Pub. No.: WO2017/053745
PCT Pub. Date: Mar. 30, 2017

(65) Prior Publication Data
US 2019/0228153 A1    Jul. 25, 2019

Related U.S. Application Data

(60) Provisional application No. 62/222,465, filed on Sep. 23, 2015.

(51) Int. Cl.
*G06F 12/14* (2006.01)
*G06F 21/56* (2013.01)
*G06F 21/62* (2013.01)

(52) U.S. Cl.
CPC ......... *G06F 21/566* (2013.01); *G06F 21/565* (2013.01); *G06F 21/6218* (2013.01); *G06F 2221/034* (2013.01)

(58) Field of Classification Search
CPC .. G06F 2212/7203; G06F 21/64; G06F 21/56; H04L 63/145; H04L 29/06918
(Continued)

(56) References Cited

U.S. PATENT DOCUMENTS 7,487,368 B2 * 2/2009 Inomata ............... G06F 21/55
713/189
7,530,106 B1 5/2009 Zaitsev et al.
(Continued)

OTHER PUBLICATIONS

Ahmadian et al, Connection-Monitor and Connection-Breaker: A Novel Approach for Prevention and Detection of High Survivable Ransomwares, 2015, IEEE, pp. 79-84.*
(Continued)

*Primary Examiner* — Alexander Lagor
*Assistant Examiner* — Jenise E. Jackson
(74) *Attorney, Agent, or Firm* — Alston & Bird LLP

(57) ABSTRACT

Techniques and systems are described for detecting malware's bulk transformation of a user's data before the malware is able to complete the data transformation. Included are methods and systems for enabling malware detection by monitoring the file operations of a computer application or process for particular kinds of suspicious data transformation indicators. Indicators include primary indicators, such as file-type signature changes, notable changes in file data entropy, and out-of-range similarity measurements between the read and write versions of file data, as well as secondary indicators, such as a large number of file deletions and a large reduction in the number of file-types written versus read by a process over time. When indicators are triggered by a process, an adjustment to the process'
(Continued)

malware score is made; in the event that the process' malware score reaches a malware detection threshold, the process is marked as malware and appropriate actions are taken.

17 Claims, 5 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 7,930,750 | B1* | 4/2011 | Gauvin | H04L 63/1416 709/223 |
| 8,312,536 | B2 | 11/2012 | Nachenberg et al. | |
| 8,683,585 | B1 | 3/2014 | Chen et al. | |
| 9,317,686 | B1* | 4/2016 | Ye | G06F 11/1461 |
| 9,852,289 | B1* | 12/2017 | Mann | G06F 21/60 |
| 10,303,875 | B1* | 5/2019 | Saxe | G06F 21/563 |
| 2005/0131900 | A1* | 6/2005 | Palliyll | G06F 16/9014 |
| 2006/0277226 | A1* | 12/2006 | Chikusa | G06F 16/10 |
| 2008/0184367 | A1 | 7/2008 | McMillan et al. | |
| 2011/0197281 | A1* | 8/2011 | Alme | G06F 21/552 726/24 |
| 2012/0054870 | A1* | 3/2012 | Stahlberg | G06F 21/56 726/24 |
| 2015/0058987 | A1 | 2/2015 | Thure et al. | |
| 2016/0292419 | A1* | 10/2016 | Langton | G06F 21/567 |
| 2016/0378988 | A1* | 12/2016 | Bhashkar | G06F 21/566 726/24 |
| 2019/0235981 | A1* | 8/2019 | Jakob | G06F 11/2082 |

OTHER PUBLICATIONS

Nath et al, Static Malware Analysis Using Machine Learning Methods, 2014, Springer-Verlag, pp. 440-441.*

Agrawal et al., "A five-year study of file-system metadata," ACM Transactions on Storage, Oct. 2007, pp. 1-32, vol. 3, No. 3.

Chen et al., "Towards an understanding of anti-virtualization and anti-debugging behavior in modern malware," IEEE International Conference on Dependable Systems and Networks, Jun. 2008, pp. 1-10.

Douceur et al., "A large-scale study of file-system contents," Proceedings of the 1999 ACM SIGMETRICS International Conference on Measurement and Modeling of Computer Systems, May 1999, pp. 1-12.

Garfinkel et al., "Bringing science to digital forensics with standardized forensic corpora," Digital Investigation, Sep. 2009, pp. S2-S11, vol. 6.

Hicks et al., "Organizing and managing personal electronic files: a mechanical engineer's perspective," ACM Transactions on Information Systems, Sep. 2008, pp. 1-40, vol. 26, No. 4.

Jana et al., "Abusing file processing in malware detectors for fun and profit," 2012 IEEE Symposium on Security and Privacy, May 2012, pp. 80-94.

Kim et al., "The design and implementation of tripwire: a file system integrity checker," Purdue Technical Report CSD-TR-93-071, Nov. 1993, pp. 1-21.

Kornblum, "Identifying almost identical files using context triggered piecewise hashing," Digital Investigation, Sep. 2006, pp. S91-S97, vol. 3S.

Maiorca et al., "Looking at the bag is not enough to find the bomb: an evasion of structural methods for malicious PDF files detection," Proceedings of the 8th ACM SIGSAC Symposium on Information, Computer, and Communications Security, May 2013, pp. 1-11.

Marpaung et al., "Survey on malware evasion techniques: state of the art and challenges," 2012 14th International Conference on Advanced Communication Technology, Feb. 2012, pp. 744-749.

Oberheide et al., "PolyPack: an automated online packing service for optimal antivirus evasion," Proceedings of the 3rd USENIX Conference on Offensive Technologies, Apr. 2009, pp. 1-6.

Oberheide et al., "CloudAV: N-version antivirus in the network cloud," USENIX Security Symposium, Jul. 2008, pp. 1-16.

Roussev, "Data fingerprinting with similarity digests," Advances in Digital Forensics VI: IFIP Advances in Information and Communication Technology, Jan. 2010, pp. 207-226.

Ugarte-Pedrero et al., "SoK: Deep packer inspection: a longitudinal study of the complexity of run-time packers," 2015 IEEE Symposium on Security and Privacy, May 2015, pp. 659-673.

International Search Report/Written Opinion, PCT International Application No. PCT/US20161053365, PCT/ISA/220, PCT/ISA/210, PCT/ISA/237, dated Dec. 28, 2016.

* cited by examiner

MALWARE DETECTION VIA DATA TRANSFORMATION MONITORING

CROSS-REFERENCE TO RELATED APPLICATIONS

This application is a national stage application of International Patent Application No. PCT/US2016/053365, filed Sep. 23, 2016, which claims the benefit of U.S. Provisional Application Ser. No. 62/222,465, filed Sep. 23, 2015, both of which are incorporated herein by reference in their entireties, including any figures, tables, and drawings.

STATEMENT OF GOVERNMENT SUPPORT

This invention was made with government support under grant number CNS1464087, awarded by the National Science Foundation. The government has certain rights in the invention.

BACKGROUND

Ransomware is a class of malware that attempts to extort users by holding their computer or documents hostage. Ransomware often works by obfuscating the contents of user files through the use of strong encryption algorithms. Ransomware differs from other types of malware in that its effects are directly reversible only via the decryption keys held by a remote adversary. Victims have little recourse other than paying the attacker to reverse this process. Some attackers even enforce strict deadlines and host elaborate customer service sites to encourage victims to pay.

Combating ransomware is difficult for a number of reasons. First, this kind of malware is easy to create or obtain, and it elicits immediate returns that create lucrative opportunities for attackers. Second, the operations performed by such malware can be difficult to distinguish from those of benign software. Finally, because the target of malware attacks is often the "unsophisticated" user, best practices that can preserve user data, such as regular data backups, are unlikely to have been employed.

While this genre of malware has existed for well over a decade, its increasingly widespread use now causes tens of millions of dollars in consumer losses annually. As such, ransomware represents one of the most visible threats to end users. Furthermore, because developing new variants is trivial, ransomware is capable of evading many existing antivirus and intrusion detection systems. Accordingly, a solution to automatically protect users even in the face of previously unknown samples is needed.

BRIEF SUMMARY

Embodiments of the subject invention facilitate the detection of malware's bulk transformation of a user's data before the malware is able to complete the data transformation. Techniques and systems are disclosed for enabling malware detection by monitoring the file operations of a computer application or process for particular kinds of suspicious data transformation indicators. Data transformation indicators can include primary indicators, such as file-type signature changes, notable changes in file data entropy, and out-of-range similarity measurements between the read and write versions of file data. Data transformation indicators can also include secondary indicators, such as a large number of file deletions and a large reduction in the number of file-types written versus read by a process over time.

Generally, when transformation indicators are triggered by a process, the triggering causes an adjustment to the process' malware score; in the event that the process' malware score reaches a malware detection threshold, the process is marked as malware and appropriate actions are taken. In certain embodiments, the triggering of a plurality, or "union," of data transformation indicator types by a process may be used to enhance the accuracy of malware detection.

Embodiments of the subject invention can include a malware detector that is implemented as a stand-alone utility or integrated into an existing anti-malware software package such as those provided by McAfee, Symantec, Microsoft, Sophos, and Kaspersky. In some embodiments, a process' file operations may be buffered temporarily.

These techniques and systems advantageously enable, e.g., an anti-malware software package to deny the malware access to the totality of the user's data, minimizing the pressure to pay an adversary. In experimental results, example embodiments detected and stopped 100% of 492 real-world ransomware samples, with as few as zero files lost and a median of 10 files lost. Experimental results also showed no false positives in testing with common benign software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
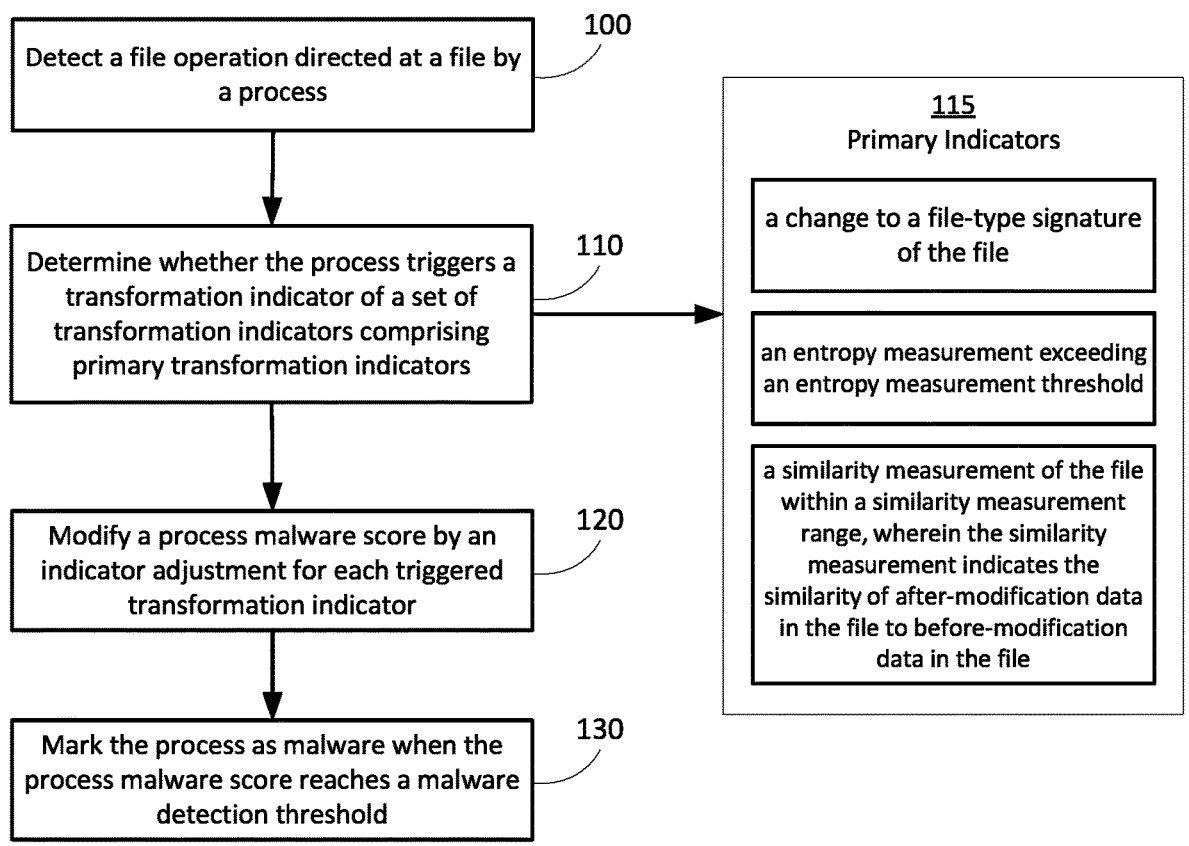
FIG. 1 shows an example process flow for components enabling malware detection via data transformation monitoring.

Generally, anti-malware products such as McAfee® VirusScan and Symantec® Endpoint Protection attempt to identify malware before it can start by comparing or matching the malware to known "signatures". Signature matching analyzes applications based on known malware characteristics and flags programs that match previously observed intrusions. Over years of development, the common characteristics in modern malware signatures have made this technique for classifying known malware extremely accurate. However, a limitation of this approach is that malware that has not been previously observed is difficult to identify. Furthermore, recent research has shown that evading signature detection is possible with relative ease when the malware signatures used are too rigid [3, 7, 10, 11]. While combining multiple intrusion detection systems (IDS) suites using different techniques may provide some added accuracy [13], it is still possible to use automated malware packing techniques to evade tiered anti-malware products [12,15]. Rather than analyzing the signature for malicious software directly, some work has gone into developing file integrity monitors such as Tripwire [8], which alert the administrator when system-critical files are modified. However, these monitors are based on simple hash comparisons, and fail to distinguish between legitimate file accesses and malicious modifications.

If successful, these products protect the user's system from the malware. However, in the event that the malware is not detected, the malware is often able to assume control of the user's system without his/her knowledge and alter or destroy all the data on the user's system. The ease with which such malware can be written and obfuscated limits the effectiveness of traditional signature-based detection schemes.

A signature behavior of ransomware is its encryption of the victim's data. Ransomware must read the original data, write the encrypted data, and remove the original data to complete this transformation. Detecting calls to standard encryption libraries is not a sufficient method of determining the presence of malware, since many kinds of applications use encryption libraries; furthermore many malware variants implement their own versions of these algorithms.

Techniques and systems herein describe a more effective solution based on detecting malware's bulk transformation of a user's data before the malware is able to complete the data transformation. These techniques and systems advantageously enable, e.g., an IDS to deny the malware access to the totality of the user's data. An approach centered on the user's data transformation minimizes the pressure to pay an adversary, since the data loss can be minimized.

Techniques and systems are disclosed for enabling malware detection by monitoring particular data transformation indicators of a computer application or process. Generally, when transformation indicators are triggered by a process, the triggering causes an adjustment to the process' malware score; in the event that the process' malware score reaches a malware detection threshold, the process is marked as malware and appropriate actions are taken. In certain embodiments, the triggering of a plurality of data transformation indicator types by a process may be used to enhance the accuracy of malware detection.

Embodiments of the subject invention can include a malware detector. In some cases, the malware detector may be implemented as a stand-alone utility. Alternatively, the malware detector may be fully integrated into an IDS, e.g., an existing anti-malware software package such as those provided by McAfee, Symantec, Microsoft, Sophos, and Kaspersky. In some cases, the malware detector can itself include one or more components residing at different software, hardware, or firmware layers in a computing device or system. For example, a malware detector can have a component at the more privileged "kernel" driver layer of the software architecture to detect (and interrupt) file operations, a component at the service or daemon software layer to perform caching, measurement, and/or scorekeeping activities, and a component at the user level to provide user interface and/or management capabilities.

FIG. 1 shows an example process flow for components enabling malware detection via data transformation monitoring. The process flow of FIG. 1 may, for example, be used or performed by a malware detector component (or components) integrated into a system environment such as the one described in FIG. 4.

Figure 4:
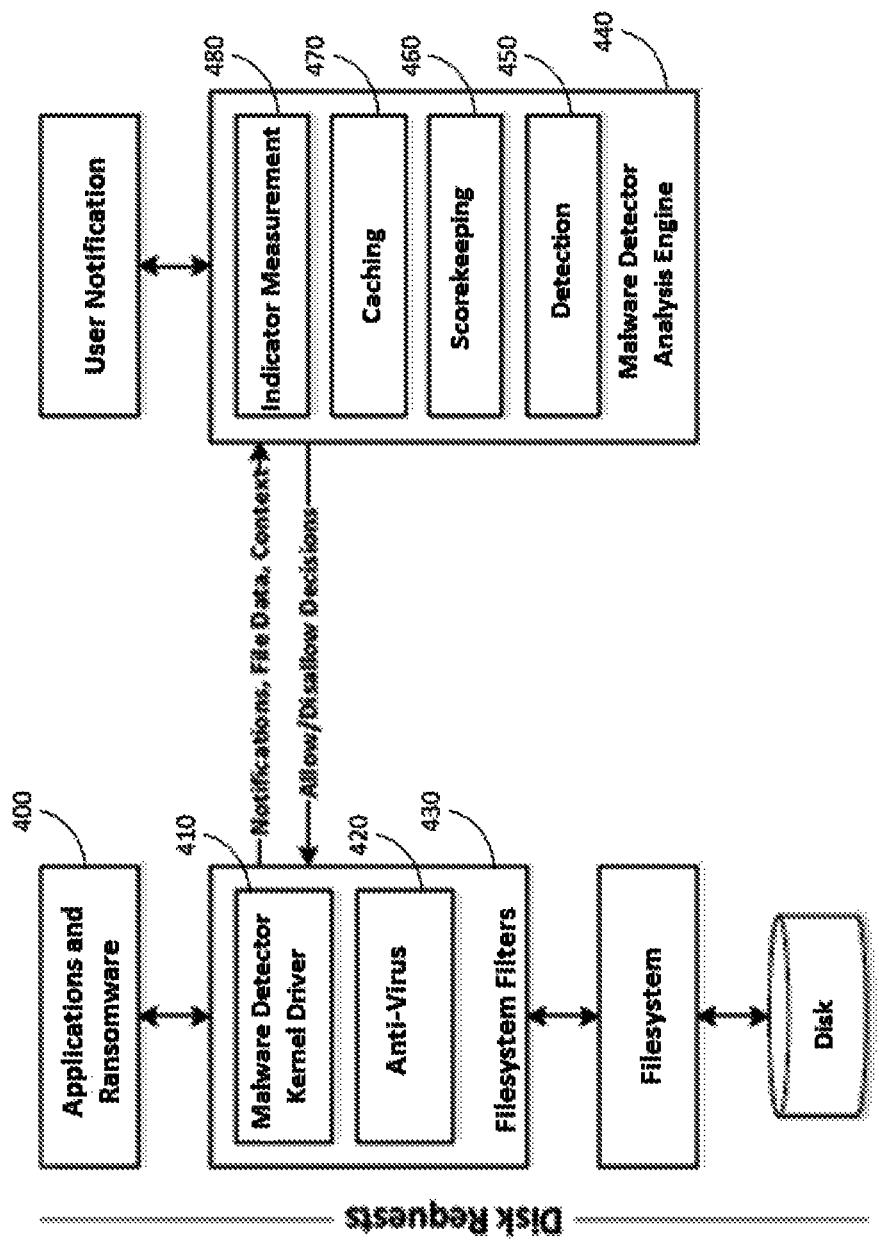
FIG. 4 shows an example component environment in which a malware detector can be implemented.

Initially, a file operation directed at a file by a process is detected (100), for example, by a malware detector as described in FIG. 4. Detection of the file operation is, in some embodiments, performed by a file system "filter" or "driver," a software component that often runs with higher privilege levels in an operating system (OS). Higher privilege levels may allow the driver to detect or intercept basic "disk" (or other storage media) access function calls ("file operations"). File operations can include, for example, "reads" and "writes" to the file data in files, as well as creating, moving, renaming, and deleting the files themselves. In some cases, the driver may have similar privilege levels to other OS or kernel components. In at least some implementations, the file operation may be directed at a user document file, e.g., a word processing document located in a user document directory (such as the "My Documents" directory on Microsoft Windows®).

As used herein, a "process" or "system process" refers to an instance of a computer program (e.g., a collection of instructions or "code") that is currently being executed by a computing system or processing system. Thus, a "malware process" can be any collection of instructions, actively being run by the computing system, that performs undesirable activities on the computing system.

When a file operation has been detected emanating from a process by, e.g., the driver, it can be determined whether the process triggers a "transformation indicator" (110). Several kinds of transformation indicator may provide clues that the process is a malware process. Transformation indicators may be pertinent to the file and/or to the process performing the file operation, depending on the nature of the indicator. "Primary" transformation indicators (e.g., 115) are those that may be considered highly indicative of a malware process, whereas "secondary" transformation indicators may be indicative, but less so, or only indicative in the presence of one or more primary indicators. In some cases, the presence of a particular combination of indicators may itself be an indicator of malware (e.g., a "union" indicator). A detailed discussion of several types of data transformation indicators, and how they are measured, follows below.

The specific activities that ransomware performs can be refined into the following classes: Class A ransomware overwrites the contents of the original file by opening the file, reading its contents, writing the encrypted contents in-place, then closing the file. It may optionally rename the file. Class B ransomware extends class A, with the addition that the malware moves the file out of the user's documents directory, for example, into a temporary directory. It then reads the contents, writes the encrypted contents, and moves the file back to the user's directory. The file name at the end of the process may be different than the original file name. Class C ransomware reads the original file, creates a new, independent file containing the encrypted contents, and deletes the original file. This class of malware may use two independent file access streams to read and write the data.

Some types of transformation indicators may be more effective against some kinds of malware. For example, transformation indicators that compare differences between versions of a file before and after a file modification may be less effective against class C malware (i.e., malware that copies and encrypts files to a different directory and deletes the original file) than class A and class B malware.

One type of "primary" transformation indicator is a file-type signature change. The type of data stored in a file can be approximated using "magic numbers." These magic numbers describe the order and position of specific byte values in the file data, producing a unique "signature" for the file-type. Magic numbers may be present throughout a file and not simply in the file's header information. Since files generally retain their file-type and formatting over the course of their existence, when a process modifies file-type data on a large-scale, it can be a useful indicator that the process contains malware.

File-type signatures may be determined in a variety of ways. For example, the FILE utility is a popular program for determining file-type that is bundled with many Linux distributions. The program's default "magic" database library contains hundreds of file-type signatures, ranging from specific programs (e.g., "Microsoft Word 2007+") to general content (e.g., "Unicode text, UTF-7"). Using tools like FILE to match signatures, the file-type before a file is written and after the file is written may be compared. When the file-type of a file changes after a data modification, a transformation indicator is triggered.

A file-type change indicator may be a reliable sign of malware in some cases. For example, an experimental review of file-type changes resulting from encryption indicated that 99.7% of a group of test files (6,520) exhibited a file-type change during encryption by a standard malware sample. Of these, 96% were the non-match "data" file-type after encryption, which indicates no match to a known signature. The remainder was distributed among other file-types (e.g., "DOS Executable (COM)" and "Atari 68xxx executable"), although none appeared to be truly valid instances of these types. The remaining 0.03% that did not appear to have a changed file-type measured as generic "data" before encryption, meaning that the before and after file-types were a match.

Another type of transformation indicator applicable to some embodiments is a similarity measurement of the file. A similarity measurement indicates the similarity of data in the file after modification to the data that was in the file before modification. Such meaningful changes to file data can be captured through the use of similarity-preserving hash functions [9, 14]. Similarity-preserving hash functions differ from traditional cryptographic hash functions because the hash (or "digest") produced by the similarity-preserving hash function retains information about the source data. By comparing two "similarity digests," one created before the file data was modified and one created after the file data was modified, it is possible to determine a similarity measurement that gauges the level of relatedness of the file data across versions of the file.

Strong encryption of file data generally produces an output that provides no relation to the original plaintext content. Therefore, the output of ransomware, encrypted file data, is typically completely dissimilar to the original file data. Hence, a similarity measurement as described above may indicate that file data was encrypted and thus provide a transformation indicator useful for detecting malware.

Examples of hash function libraries that provide similarity-preserving hashes and functions for comparing such hashes include, e.g., "SSDEEP", "SDHASH" and "BBHASH". Some kinds of similarity-preserving hash function libraries may produce similarity scores or similarity measurements that indicate a percentage of similarity, while others may produce scores that describe a confidence, or a probability of similarity, between the data. In at least one embodiment of the subject invention, SDHASH is used as the hash function library for deriving the similarity measurement.

Naturally, the similarity measurement range that triggers the presence of an indicator may vary with respect to the technologies used to derive the similarity hashes and similarity measurements. In an embodiment using SDHASH, for example, the similarity measurement is a similarity score from 0 to 100 describing the confidence of similarity between the two versions of the file data. In SDHASH, a score of 0 is statistically equivalent to comparing two blobs of random data; 1-10 is considered a weak likelihood of similarity; 11-20 is considered marginal likelihood; and 21-100 is considered a strong likelihood of similarity.

Given the similarity hash of the previous version of a file, a comparison with the hash of the encrypted version of that file should yield no match, since the encrypted ciphertext should be indistinguishable from random data. Thus, in embodiments using SDHASH, a similarity measurement range for triggering a similarity transformation indicator may be zero.

Figure 2:
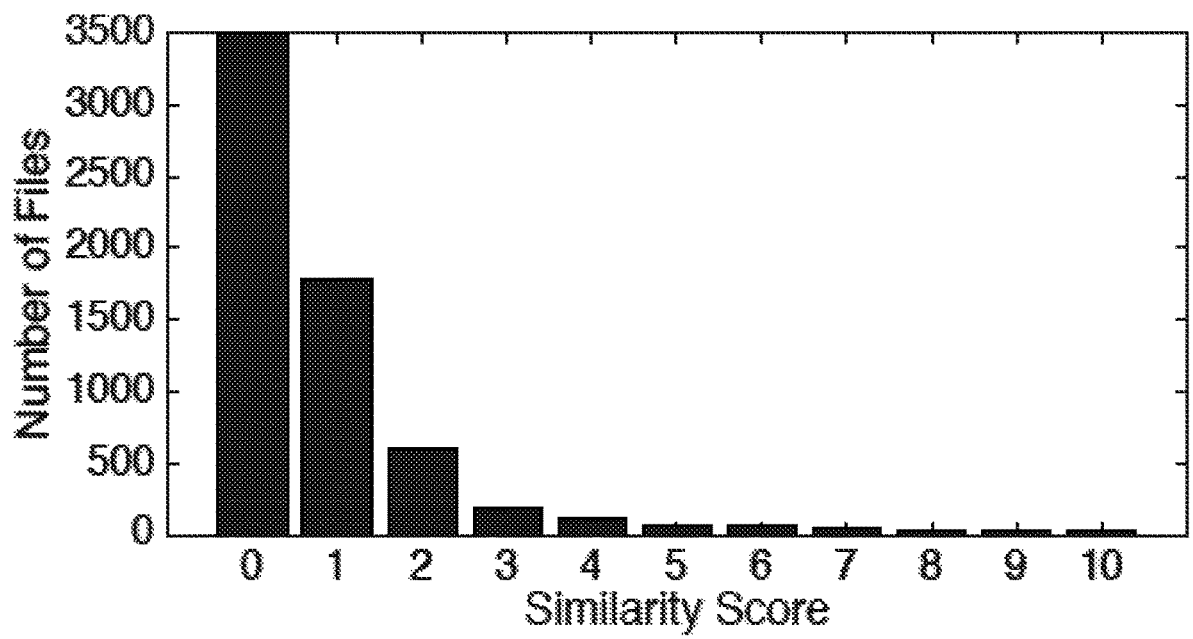
FIG. 2 shows a chart indicating the results of similarity measurements on a file corpus after a ransomware sample encrypted them.

In an example embodiment, similarity hashes were generated with SDHASH before and after a ransomware sample encrypted them, and then the similarity measurements were calculated. FIG. 2 shows a chart indicating the results of similarity measurements on a file corpus after a ransomware sample encrypted them. FIG. 2 shows that 3,492 (54%) of the encrypted files received a zero score when compared to their previous versions. Additionally, 98.8% of files received a score of 10 or less. Despite the encryption process creating pseudorandom file contents, this result shows that there is a non-trivial chance that encrypting the file has a non-zero score, though it is generally less than 10 with the SDHASH tool.

Another type of transformation indicator applicable to some embodiments is an entropy measurement. An entropy measurement of data provides information about the level of randomness in the data; the more random the data, the higher its entropy measurement. For example, the byte stream "aaaaaaaa" has lower entropy than the byte stream "a8kd5gnw".

Some types of data, such as encrypted or compressed data, are naturally high entropy. Thus, a ransomware attack may result in a consistently high entropy output as the malware reads the victim's files and writes the encrypted content. For example, the entropy of an array of bytes can be computed as the sum:

$$e = \sum_{i=0}^{255} P_{B_i} \log_2 \frac{1}{P_{B_i}}$$

for $$P_{B_i} = \frac{F_i}{totalbytes}$$

and $F_i$, the number of instances of byte value i in the array. This produces a value from 0 to 8, where 8 denotes a perfectly even distribution of byte values in the array. Encrypted data may tend to approach the upper bound of 8, since each byte in the encrypted ciphertext theoretically has a uniform probability of occurring.

In some cases, an entropy measurement of file data taken before and after a file modification operation may be compared; a significant positive delta (e.g., in excess of an entropy threshold) between the before and after measurements may indicate that the process performing the modification operation is malware. In certain cases a single entropy measurement taken after the modification operation may be used as a transformation indicator.

Figure 3:
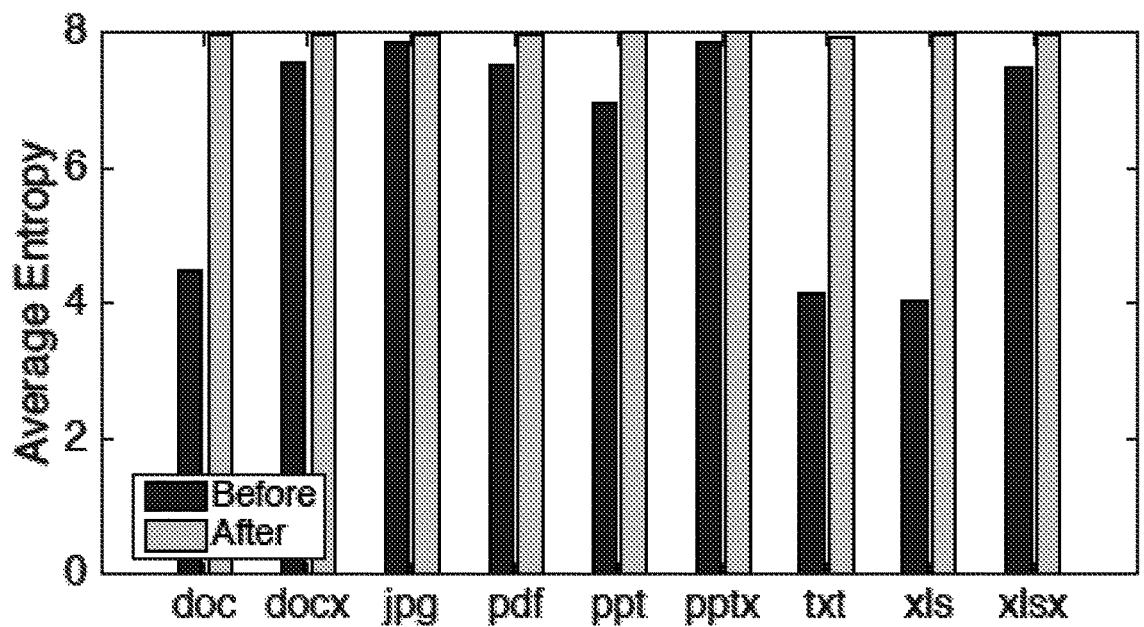
FIG. 3 shows average entropy measurements on a set of over 6,500 files from the Govdocs1 corpus.

Sometimes, the type of file data stored in the file may affect the entropy measurement. Many modern file formats, e.g., newer Microsoft Office® documents, implement compression of file contents in the file format itself. Thus, an entropy measurement of the pre-change compressed file data may be as high as the entropy measurement of the post-change encrypted file data. FIG. 3 shows average entropy measurements on a set of over 6,500 files from the Govdocs1 corpus. The measurements were taken before and after a ransomware sample encrypted them. Every file type experienced some entropy increase, though low-entropy original files experienced greater increases. In every case, the encrypted files' entropy approached the maximum possible entropy of eight.

In certain embodiments of the subject invention, entropy measurement may refer to a delta between read and write entropy for the process as a whole. In some cases, the entropy of atomic read and atomic write operations are captured as separate metrics. The delta, or difference, between the read and write entropy metrics may then be computed and, when the delta exceeds an entropy measurement threshold, the process may trigger the transformation indicator.

Embodiments using per-process entropy measurements may advantageously assist in detecting certain kinds of malware. For example, a per-process entropy indicator can remain effective against class C malware, since a per-process indicator does not rely on file comparison.

Some ransomware writes ransom payment instructions into new text files and places them in every directory. These types of small, low-entropy writes can over-influence some entropy measurements. In some embodiments, entropy values may be totaled, normalized, weighted, and/or averaged to compute a more consistent result. In some instances, for example, a weighted arithmetic mean of these entropy measurements is computed, where the weight w is defined:

$$w = 0.125 \times \lceil e \rceil \times b$$

where b is the total number of bytes in the operation and $\lceil e \rceil$ is the entropy value rounded to the nearest integer. The constant normalizes the weight to a value from 0 to 1. This mechanism of weighting helps ensure that low-entropy and small read/write operations do not over-influence the mean and provides a metric that captures a process's behavior over time.

Thus, when a file is read or written, the entropy of the bytes involved in the file operation are calculated and the respective weighted average Pread or Pwrite for the process performing the operation is updated. After each update of a process's averages, if a process has performed at least one read and one write, the difference of these means is calculated as:

$$e_\Delta = P_{write} - P_{read}$$

where $e_\Delta \geq 0$. This delta determines the extent that write entropy has exceeded read entropy.

The process may be suspicious and trigger the entropy transformation indicator when the entropy measurement (in this embodiment, $e_\Delta$) exceeds an acceptable entropy measurement threshold. For example, when a process entropy measurement exceeds an experimentally-determined, and configurable, entropy measurement threshold ($e_\Delta \geq 0.1$), the entropy transformation indicator is triggered. A process-based entropy measurement is stateless with regard to the previous or future state of a file and occurs for every atomic read or write operation where the threshold is exceeded. While this threshold is small compared to the total range of possible entropy values (0-8), this value provides resolution for detecting the small entropy increase for compressed files.

The aforementioned "primary" transformation indicators may provide a very strong suggestion of the presence of malware. In some embodiments, additional (or "secondary") indicators may be used to assist in detection by further increasing the process malware score. These secondary indicators may be relevant, for example, when malware is of "class C" and thus does not trigger one or more of the "primary" transformation indicators.

One type of secondary indicator used in some embodiments is a file deletion indicator. File deletion is a basic file system operation and is not generally suspicious; for example, applications often create and delete temporary files as part of their normal operation. However, the deletion of many files from a user's documents may indicate malicious activity. Class C ransomware uses file deletion instead of overwriting an existing file to dispose of the original content. Class C ransomware performs a high number of these operations; thus, early detection of this type of malware may be enhanced by the use of a file deletion indicator.

A type of secondary indicator used in some embodiments is a file-type change measurement (or "funneling") indicator. Applications that read multiple file-types but write only a single type during an execution are not uncommon. A word processor, for example, may allow the user to embed various file-types (e.g., pictures and audio) but will typically only write a single file-type (the output document). However, certain malware takes this innocuous case to an extreme. As ransomware encrypts and writes data, a larger number of input file-types may "funnel" into a smaller number of output file-types. By tracking the number of file-types a process has read and written, a file-type change measurement can be derived that triggers the indicator when it exceeds a file-type change measurement threshold value.

The presence (i.e., triggering) of an indicator in a process modifies the process malware score for the process by some indicator adjustment value (120). The process malware score represents a tabulation of triggered indicators, the indicator adjustment value represents the amount by which the process malware score is affected by the detection of an instance of any particular kind of transformation indicator, and the malware detection threshold represents the condition at which the process malware score indicates a process is likely malware and should be marked or registered as such.

In some embodiments, the indicator adjustment value may vary according to the type of transformation indicator that is triggered. In some cases, for example, primary indicators may have an indicator adjustment value that is larger than (e.g., 2×, 3×, 10×) the secondary indicators. In some cases, each type of transformation indicator in the set of transformation indicators may have a different indicator adjustment value assigned to it. In embodiments with a union indicator (described below), a combination of triggered indicators may itself be an "indicator" with its own assigned indicator adjustment value. Naturally, in some embodiments, all the transformation indicator types may have the same indicator adjustment value and thus have equal impact on the process malware score when triggered.

If the process malware score reaches a malware detection threshold, the process is marked as malware (130). Depending on the embodiment, different effects may ensue as a consequence of the process being marked as malware. For example, in some cases all storage media accesses for the flagged process may be halted until the user permits the suspect process to continue. In some cases, the malware process may be terminated. In some cases, e.g., when components for data transformation monitoring are embodied in a larger IDS, the residue of the malware (e.g., executable files, scripts, configuration changes, etc.) may be scrubbed from the user's computing system.

Certain described techniques rely on monitoring processes in real-time for changes in user file data; therefore, some files may be lost during the detection of the malware. Some embodiments may include techniques and systems for storing, buffering, and/or postponing the execution of a quantity of file operations until the process has reached a reliability threshold. To help prevent the loss of any user data, file operations can be intercepted and buffered. Buffering of the file operations may occur, for example, in a cache memory until the process has operated reliably on a selectable or configurable number of files. The buffer may be configured as a first-in-first-out (FIFO) queue sized to hold the file modification operations for several files. When the FIFO buffer runs out of capacity, the oldest file modifications may be committed from the queue to make room for the next stored modification. In the event the process is marked as malware, the buffer can be disposed of without committing any of the queued file modifications. Using an appropriately sized buffer, file data modifications can be postponed until a process is more likely to be reliable. Experimental data from an example implementation indicates that the median number of files lost to ransomware was 10 out of a total of 5,100. Therefore, for example, a FIFO buffer sized to hold writes to the last 10 files may be configured in some embodiments.

Some embodiments may advantageously provide benefits in a cloud storage implementation environment. The use of cloud storage synchronization software (e.g, Dropbox, Google Drive, etc.) is becoming more pervasive. Ransomware can exploit these systems by encrypting the local copies of the user data, which is then synchronized to the victim's other hosts. Embodiments of the subject invention may be effective for a large scale deployment as a component of a cloud storage provider that can recognize when a transformation is occurring and deny the files from being uploaded and synchronized. Though some cloud storage providers offer versioning and rollback, such embodiments may obviate the need to manually roll back each affected file by preventing them from being synchronized at all.

It should be noted that any examples herein of a malware score, detection threshold, and indicator adjustment are not intended to be limiting. For example, the process malware score can start as some number, e.g., 500; the indicator adjustment may be a subtraction from the process malware score, and the malware detection threshold is reached when the process malware score reaches zero. As another example, the process malware score can have an initial value of zero, the indicator adjustment may be additive to the score, and the malware detection threshold is reached at some positive number. Furthermore, indicator triggering thresholds or ranges (such as the entropy measurement threshold, similarity measurement range, file deletion measurement threshold, and file-type change measurement threshold) are dependent on the particular implementation environment, may be experimentally derived, and may also be configurable. Certain effective thresholds and ranges for some environments were experimentally derived and are shown below in the Examples section.

In some embodiments, a "union indicator" may be used to enhance malware detection capabilities. A union indicator may be triggered when a process triggers all, or a selected combination of more than one of, the primary transformation indicators. Although an individual transformation indicator provides value in isolation, a union indicator may be used to heighten suspicion of a process so that a malware process is detected and/or interrupted more quickly.

Experimental results (described subsequently) indicate that no experimentally-tested benign process triggers the union indicator, while a substantial portion of malware processes do. Therefore, in an embodiment of the subject invention, the triggering of the union indicator causes the immediate marking of the process as malware without regard to the process malware score or malware detection threshold. In some implementations, the immediate marking of the process as malware enables an antivirus software program to perform whatever isolation and cleaning operations that it may provide, including, e.g., terminating the process and removing the malware instructions from the computing device. In some embodiments, marking the process as malware may include halting any and all file operations of the process. This capability may be provided, for example, by a file operation filtering component of the malware detector; a detector or interceptor of file operations at the kernel of the operating system can remove, halt, or dispose of file operation commands from the malware process before they reach the file system or storage media.

In some embodiments, the triggering of the union indicator may affect the process malware score and/or malware detection threshold of the process. For example, detection of the union indicator may result in altering the process malware score by a different (e.g., larger) indicator adjustment value than the value by which a single transformation indicator changes the malware score. In some instances, the process malware detection threshold may also be changed (e.g., lowered) to a distinct value particular to processes that show the union indicator. For example, it may be lowered to a "union" process malware detection threshold which is different from the "non-union" threshold applied to processes that do not exhibit the union indicator.

In one embodiment, for example, the first time a process exhibits the union indicator, its process malware detection threshold is lowered to the "union" threshold. The process malware score is also increased by 100 points to allow faster detection. Each subsequent union indication triggered by the same process also adjusts the process malware score by 100 points. Thus, processes that repeatedly exhibit this suspicious combination of operations will reach the detection threshold quickly, limiting the amount of damage that the process can do before it is detected. Notably, if a process does not exhibit the union indicator, a higher, non-union process malware detection threshold is maintained. Experimentation on an example embodiment found that the process malware detection thresholds of 100 for "union" processes and 200 for "non-union" processes may provide quick detection with a low number of false positives.

In certain embodiments, additional permutations of a "union" indicator may be provided for combinations of primary and secondary indicators. Such embodiments may be helpful, for example, for quickly detecting class C ransomware. For example, the entropy and the similarity primary indicators, when triggered with the file deletion secondary indicator, may form a type of union indicator. Alternatively, the entropy primary indicator, combined with the triggering of both the file deletion and the file-type change measurement secondary indicators, may also form a type of union indicator. Any permutation of primary/secondary indicators may have distinct "union" process malware detection thresholds and indicator adjustments.

Additional types of indicators in the set of transformation indicators may be included in some embodiments. One additional type of indicator is a "rate of change" transformation indicator. A rate of change indicator monitors the speed at which a process is modifying user data, accessing user data, or triggering transformation indicators against user data. A rate of change indicator may be triggered, for instance, with respect to an absolute threshold (e.g., file operations/sec, indicators triggered per second) or a relative threshold (e.g., percentage faster than process averages on the computing system).

A type of additional indicator may be an "aggregate amount of change" transformation indicator. An aggregate amount of change indicator monitors the total number of user files a program has accessed or modified. A threshold for triggering the aggregate amount of change indicator can be, for instance, absolute, relative to other processes on the computing system, configurable by an administrator, and/or tuned in accordance with historical measurements.

A type of additional indicator in some embodiments can be a transformation indicator that detects excessive or deliberate targeting of specific file types. For example, if a process is detected to be iterating through the directory hierarchy of a file system, but only selects particular file types (e.g., .PDF or .DOC files) on which to perform file operations, it may trigger the "targeting specific file types" indicator. Measurement of such an indicator might include, for example, a ratio of file types modified to file types iterated.

Any additional types of indicators may be categorized, for example, as primary indicators, secondary indicators, and union indicators, and any of the additional types of indicators may be in the set of transformation indicators.

FIG. 4 shows an example component environment in which a malware detector can be implemented. It should be noted that a malware detector can itself be comprised of one or more components residing at different software, hardware, or firmware layers in a computing device or system. For example, a malware detector can comprise a component at the more privileged kernel driver layer of the software architecture to detect (and interrupt) file operations, a component at the service or daemon software layer to perform caching, measurement, and/or scorekeeping activities, and a component at the user level to provide user interface and/or management capabilities.

In FIG. 4, applications and executables 400, which can include malware processes, transform file data by sending disk requests to the file system, which writes the data to disk (or other storage media) using low-level hardware calls. Generally, an operating system allows filesystem filters 430 to intercept and mediate calls between the application layer 400 and the filesystem layer. Indeed, some anti-virus software places filters at this level 420. An embodiment of the subject invention can place a driver (e.g., a kernel driver) 410 at the filesystem filter 430 layer to intercept and detect file operations by processes running at other layers of the system.

In some embodiments, a malware detector analysis engine component 440, for example, implemented as a service or daemon, can perform analysis functions. These analysis functions may be, for example, system-wide, common, or consolidated across all processes. The analysis functions may be themselves embodied in components such as detection 450, scorekeeping 460, caching 470, and indicator measurement 480. These components may perform aspects of the techniques described herein.

Performing type and similarity measurement on the original files at the time of opening can delay the opening of files, which can result in a poor user experience. In some embodiments, certain measurements on the files are cached, for example, at system startup or upon initialization of the malware detector. For example, the user's document directories can be scanned upon initialization of the malware detector, and each file's type and similarity hash can be cached. The system then waits for file operations to occur and, for those indicators using before-modification and after-modification measurements/deltas, the cached value is used for the before-modification measurement. Caching of measurements may be performed, for example, by a caching component 470 of the malware detector.

Advantageously, embodiments of the subject invention may detect certain classes of malware far better than existing malware detection technology. Some ransomware, for instance, is implemented using scripting languages that operate within other, typically non-suspect, processes. For example, one kind of real-world ransomware (e.g., "PoshCoder") runs as a script developed in PowerShell. This kind of ransomware is notable because the ransomware does not necessarily need to be a compiled binary; as a result, it can be quickly morphed into an unknown variant and typed or piped directly into an interpreter. Signature-based anti-malware technologies poorly defend against this kind of malware because it is not necessary for the malware to exist on the disk of the victim host—it can be constructed, executed, and completed entirely in memory. This particular real-world sample continues to have an extremely low detection rate among anti-virus vendors, with only 1 out of 57 products detecting the sample. However, example embodiments of the subject invention detected this sample after only 11 files were lost. Since malware detection via data transformation is focused on the changes to user data, not malware execution characteristics, embodiments of the subject invention can potentially detect any kind of ransomware that manipulates the file system.

Figure 5:
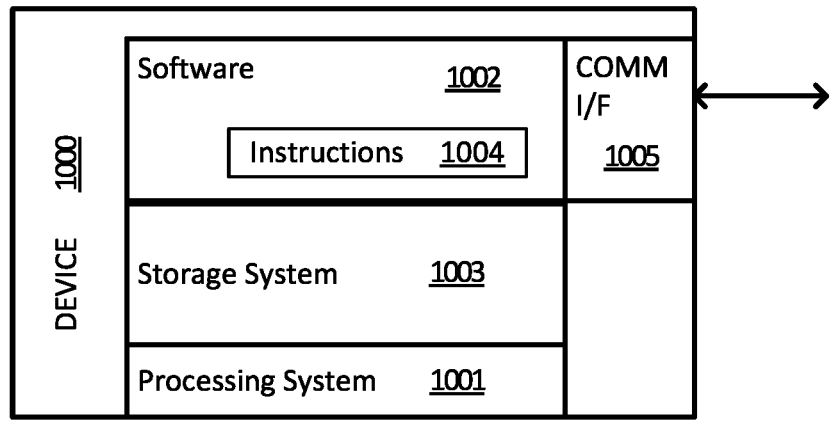
FIG. 5 shows a block diagram illustrating components of a computing device or system used in some implementations or embodiments for enabling malware detection via data transformation monitoring.

FIG. 5 shows a block diagram illustrating components of a computing device or system used in some implementations or embodiments for enabling malware detection via data transformation monitoring. For example, any component of the system, including a malware detector, may be implemented as described with respect to device 1000, which can itself include one or more computing devices. The hardware can be configured according to any suitable computer architectures such as a Symmetric Multi-Processing (SMP) architecture or a Non-Uniform Memory Access (NUMA) architecture.

The device 1000 can include a processing system 1001, which may include a processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 1003 may comprise any computer readable storage media readable by processing system 1001 and capable of storing software 1002 including, e.g., processing instructions for enabling malware detection via data transformation monitoring. Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, flash memory, solid state memory, phase change memory, 3D-XPoint memory, optical media, or any other suitable storage media. Certain implementations may involve either or both virtual memory and non-virtual memory. In no case do storage media consist of a propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by device 1000 in general or processing system 1001 in particular, direct device 1000 or processing system 1001 to operate as described herein for enabling malware detection via data transformation monitoring. Software 1002 may provide program instructions 1004 that implement components for enabling malware detection via data transformation monitoring. Software 1002 may implement on device 1000 components, programs, agents, or layers that implement in machine-readable processing instructions 1004 the methods and techniques described herein.

In general, software 1002 may, when loaded into processing system 1001 and executed, transform device 1000 overall from a general-purpose computing system into a special-purpose computing system customized to detect malware via data transformation monitoring in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may also include additional processes, programs, or components, such as operating system software and other application software.

Device 1000 may represent any computing system on which software 1002 may be staged and from where software 1002 may be distributed, transported, downloaded, or otherwise provided to yet another computing system for deployment and execution, or yet additional distribution. Device 1000 may also represent other computing systems that may form a necessary or optional part of an operating environment for the disclosed techniques and systems.

A communication interface 1005 may be included, providing communication connections and devices that allow for communication between device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

Following are examples that illustrate procedures for practicing certain disclosed techniques and/or implementing disclosed systems. Examples may be used to derive reference values operative in some embodiments. Examples may also illustrate advantages, including computationally measurable technical effects, of the disclosed techniques and systems. These examples should not be construed as limiting.

An implementation of techniques and embodiments of the subject invention was constructed for analysis of computational metrics. In summary, the experimental embodiment detects and stops ransomware with a low number of user files lost and with few false positives. Furthermore, use of the "union indicator" in an embodiment provides high-speed detection capabilities without increasing the number of false positives.

Experimental Setup. Since ransomware attacks user data, a representative file corpus of typical user document directories was assembled. Using studies that have examined the distribution of file types over an entire file system [4,2] and over user document directories [6], a document corpus of 5,099 files spread over a nested directory tree with 511 total directories was created. The proportion of file types present in [6] were approximated using data from the Govdocs1 Corpus [5], OPF Format Corpus [1], and Coldwell's audio comparison files. Random selections from the resulting data set were placed into each directory, and the directory tree was placed into the user's documents folder in a Cuckoo Sandbox guest virtual machine.

This virtual machine was instrumented with an embodiment of the subject invention as described in FIG. 4, implementing process flows as in FIG. 1. As noted with respect to FIG. 1, measurement ranges and thresholds may be configurable in some embodiments. Table I, below, shows values for and descriptions of configurable thresholds used in this example embodiment. A cryptographic hash of each document was stored before testing began to serve as a baseline for indicating whether a file was changed.

TABLE I

Configuration Values for Thresholds

| Threshold | Value | Point Assessment Condition |
|---|---|---|
| Union Score | 100 | Max score with union indication |
| Non-union Score | 200 | Max score without union indication |
| Entropy Δ | 0.1 | Calculated entropy write exceeds read by this value |
| Similarity | 0 | sdhash reports similarity score ≤ this value |
| File Type Δ | 10 | # of read file types exceeds written types by this value |

Obtained from a virus repository were 2,663 ransomware-related malware samples. Each malware sample was run, in the presence of the malware detector embodiment, until detection occurred or for a maximum time. After detection or the expiration of the maximum time, the originally stored cryptographic hashes were compared to the post-sample cryptographic hashes to determine if any documents were modified, deleted, or moved.

To cull the malware samples, if no detection occurred and no files were modified, the sample was marked as "inert" and excluded from future trials. In total, 2,171 malware samples were removed from the sample set, leaving 465 operative malware samples. The number of families of ransomware tested is more important than the raw number of samples, because each sample tested of the same family is unlikely to exhibit significantly different behavior than previous ones. Of the various types of ransomware, 14 distinct families of ransomware were collected, including all four previously-known families.

Computational Results. The experimental embodiment detected all the remaining 492 samples, quickly protecting the majority of victim's data with as few as zero files encrypted/lost before detection. This result shows effectiveness of the disclosed techniques at detecting certain classes of malware.

Figure 6:
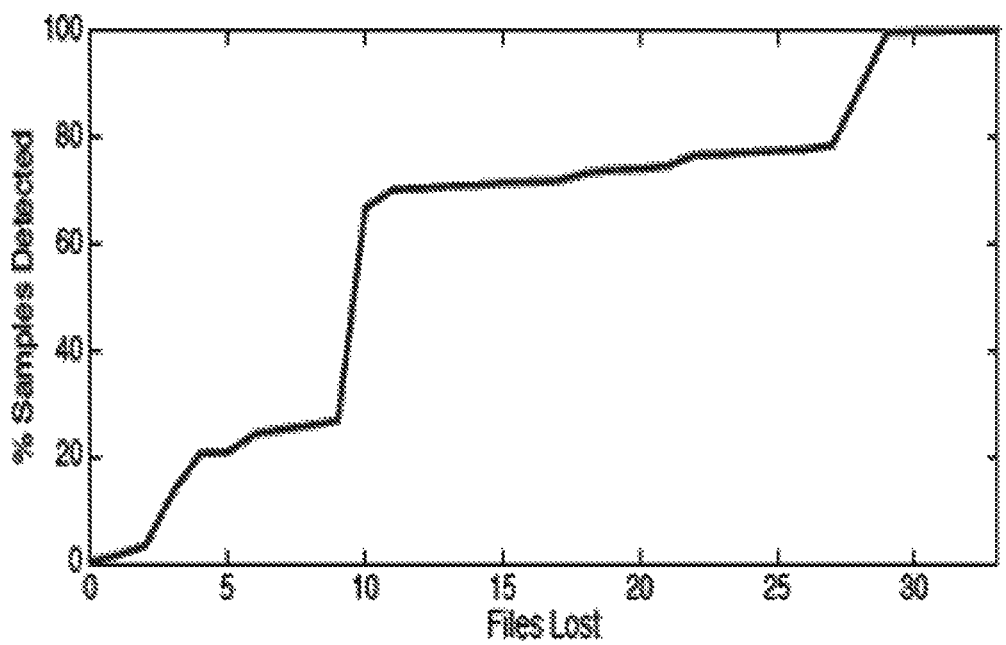
FIG. 6 shows data loss as a cumulative plot of the number of files lost to the ransomware before detection by an experimental embodiment.

Since the experimental embodiment has a 100% detection rate among the malware samples tested, the amount of data lost before detection occurs is a valuable metric. When detection occurs more quickly, fewer user files are encrypted by the ransomware and more user data is saved. FIG. 6 shows the data loss as a cumulative plot of the number of files lost to the ransomware before detection. As indicated in FIG. 6, in the median case, the system detected ransomware after only 10 of the 5,099 test files (0.2%) were lost. Advantageously, by protecting the majority of the user data, this example embodiment of the subject invention outperforms traditional anti-malware tools, which allow encryption of the user file corpus to proceed to fruition if the ransomware is not immediately detected.

The number of files lost in each case may be dependent on the particular variant and the order in which it attacks files. For example, samples which attack higher entropy files first (e.g., ".docx" files) experience a delay before being assigned points for increasing file entropy. These samples perform high-entropy reads early, resulting in a small difference between read and write entropies, but as these samples move to other files in the user's documents, this advantage quickly disappears. Furthermore, there is some difference in the types of files targeted (e.g., .xml) between malware samples.

Figure 7:
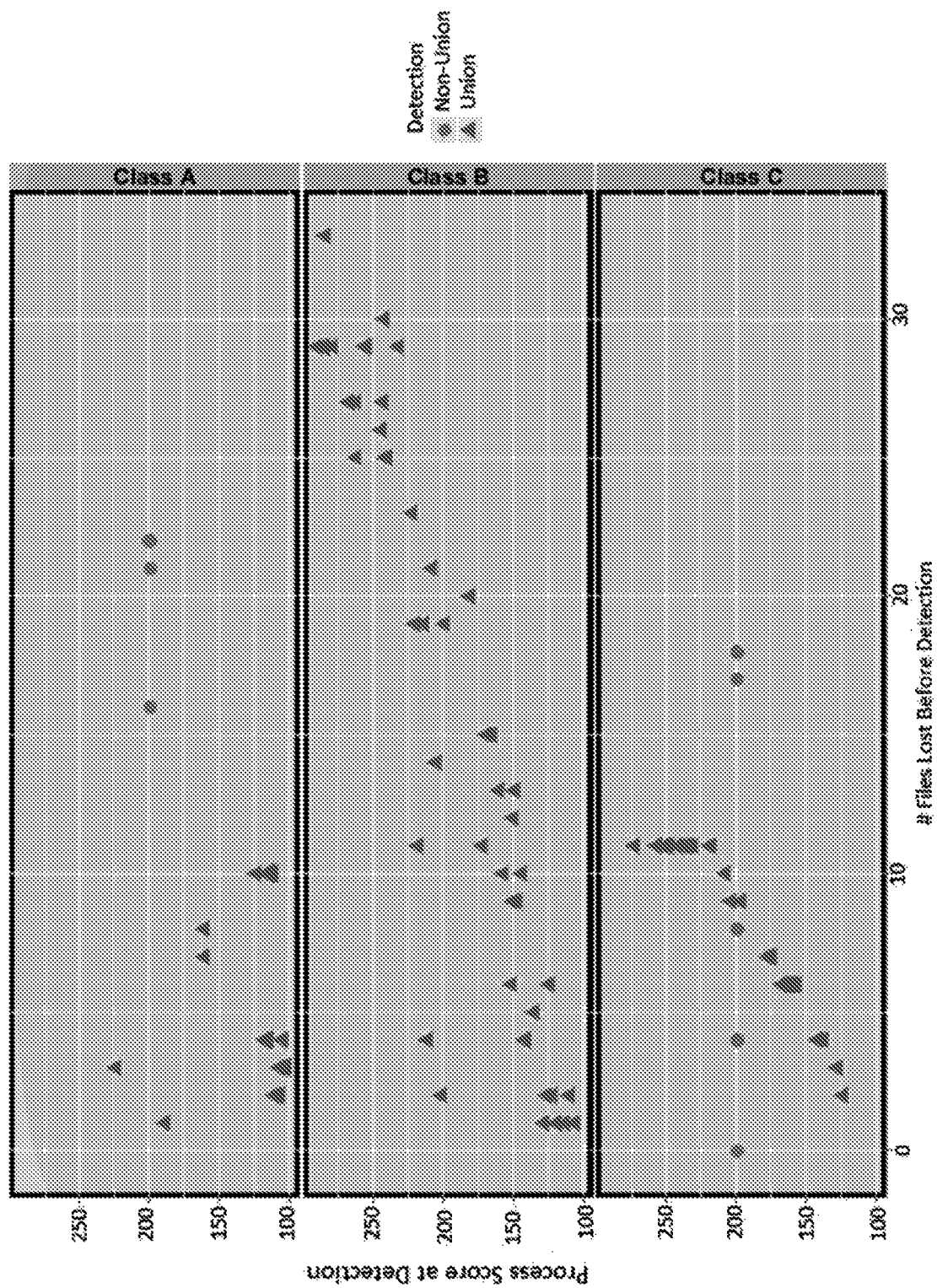
FIG. 7 shows a data set for malware samples tested in an experimental embodiment, separated by class.

FIG. 7 shows the complete data set for the live samples, separated by class. In the median case, the system detected ransomware after only 10 of the 5,099 test files (0.2%) were lost.

Effectiveness of the "union indicator" can also be evaluated from the computational results. The presence of all transformation indicators (e.g., three transformation indicators) was detected in a majority of the malware samples, with 457 samples (93%) having at least one occurrence of union indication. Advantageously, the union indicator may enable the detection of malware in as little as one file lost when used in an embodiment where the union indicator dramatically increases the process malware score as well as reduces the process malware detection threshold.

With respect to the malware in the sample set that did not trigger the union indicator, twenty of those samples were class C malware; class C malware may evade triggering the union indicator by writing the encrypted data into separate files. However, even class C malware was unable to evade overall detection because of the large number of high-entropy writes and deletes it performed. Class C malware samples remained detectable with a median loss of 16 files. Of the remaining five samples that did not trigger union indication (but were detected), two did not register similarity measurements of zero while encrypting, and the other three presented with errors of various kinds.

In addition to the example experimental embodiment being effective at quickly detecting ransomware, it is also resilient against false positives. Experiments were conducted with benign programs to show that the experimental embodiment does not produce an excessive number of false positives.

Programs were selected that were both representative of popular programs and that manage and modify content. No benign application exhibited the "union" indicator of all the primary transformation indicators (e.g., file-type change, entropy trigger, similarity trigger). Each benign process was subject, therefore, to the normal, "non-union" malware detection threshold (e.g., 200). The programs are listed below.

1. Adobe® Lightroom: A set of 1,073 JPEG image files was imported. An "automatic tone" function was performed on every picture, 5 photos were converted to black-and-white, and these 5 photos were exported to the user's documents folder. Total process malware score: 107

2. ImageMagick: A batch modification of the same 1,073 JPEG image files was performed, using the ImageMagick "Mogrify" utility. Each picture was rotated 90 degrees and saved in-place. Total score: 0

3. iTunes®: Before opening iTunes, the iTunes library was deleted to force it to generate a new one. All 70 of the Coldwell audio comparison files were imported and iTunes was allowed to convert any files that were unsupported. Three songs were played, then all of the audio files were converted to AAC format using iTunes built-in conversion function. Total score: 16

4. Microsoft Word®: A new blank document was created and 5 paragraphs of text was entered, then the file was saved. A table was created, a paragraph of text added to each cell, the formatting was adjusted, and the file saved again. A photo was imported into the file, and the file saved once again. Finally, a "SmartArt" graphic was inserted, text added to it, and the file was saved again. Total score: 0

5. Microsoft Excel®: A blank document was created and filled-in with two 500-cell columns with values. A line chart of these two columns was created, the document saved, and Excel was closed. Excel was re-opened, another column of values added, a scatter plot of these added, and the file saved again. Total score: 150

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] OPF format corpus. http://openpreservation.org/technology/corpora/opf-format-corpus/. Accessed: 2015-5-27.

[2] N. Agrawal, W. J. Bolosky, J. R. Douceur, and J. R. Lorch. A five-year study of file-system metadata. ACM Transactions on Storage (TOS), 3(3):9, 1 Oct. 2007.

[3] X. Chen, J. Andersen, Z. M. Mao, M. Bailey, and J. Nazario. Towards an understanding of anti-virtualization and anti-debugging behavior in modern malware. In IEEE International Conference on Dependable Systems and Networks, 2008.

[4] J. R. Douceur and W. J. Bolosky. A large-scale study of file-system contents. In Proceedings of the ACM SIGMETRICS International Conference on Measurement and Modeling of Computer Systems, 1999.

[5] S. Garfinkel, P. Farrell, V. Roussev, and G. Dinolt. Bringing science to digital forensics with standardized forensic corpora. Digital Investigation, 6, Supplement(0): S2-S11, September 2009.

[6] B. J. Hicks, A. Dong, R. Palmer, and H. C. Mcalpine. Organizing and managing personal electronic files: A mechanical engineer's perspective. ACM Transactions on Information Systems (TOIS), 26(4):23, 1 Sep. 2008.

[7] S. Jana and V. Shmatikov. Abusing file processing in malware detectors for fun and profit. In IEEE Symposium on Security and Privacy (SP), 2012.

[8] G. H. Kim and E. H. Spafford. The design and implementation of tripwire: A file system integrity checker. In Proceedings of the ACM Conference on Computer and Communications Security, 1994.

[9] J. Kornblum. Identifying almost identical files using context triggered piecewise hashing. Digital Investigation, 3, Supplement(0):91-97, September 2006.

[10] D. Maiorca, I. Corona, and G. Giacinto. Looking at the bag is not enough to find the bomb: An evasion of structural methods for malicious PDF files detection. In Proceedings of the ACM Symposium on Information, Computer and Communications Security, 2013.

[11] J. A. P. Marpaung, M. Sain, and H. J. Lee. Survey on malware evasion techniques: State of the art and challenges. In International Conference on Advanced Communication Technology (ICACT), 2012.

[12] J. Oberheide, M. Bailey, and F. Jahanian. PolyPack: An automated online packing service for optimal antivirus evasion. In Proceedings of the USENIX Conference on Offensive Technologies, 2009.

[13] J. Oberheide, E. Cooke, and F. Jahanian. CloudAV: N-Version antivirus in the network cloud. In USENIX Security Symposium, 2008.

[14] V. Roussev. Data fingerprinting with similarity digests. In Advances in Digital Forensics VI, IFIP Advances in Information and Communication Technology, pages 207-226. Springer Berlin Heidelberg, 2010.

[15] X. Ugarte-pedrero, D. Balzarotti, I. Santos, P. G. Bringas, and S. Antipolis. SoK: Deep Packer Inspection: A Longitudinal Study of the Complexity of Run-Time Packers. In IEEE Symposium on Security and Privacy (SP), 2015.

What is claimed is:

1. A method of detecting malware, the method comprising:
   detecting a file operation directed at a file by a process;
   determining whether the process triggers a transformation indicator of a set of transformation indicators comprising primary transformation indicators, wherein the primary transformation indicators comprise:
   a change to a file-type signature of the file,
   an entropy measurement exceeding an entropy measurement threshold, wherein the entropy measurement comprises an entropy delta between a total-write-entropy and a total-read-entropy for the process, and a similarity measurement of the file within a similarity measurement range, wherein the similarity measurement indicates the similarity of after-modification data in the file to before-modification data in the file;
modifying a process malware score by an indicator adjustment for each triggered transformation indicator; and
marking the process as malware when the process malware score reaches a malware detection threshold.

2. The method according to claim 1, wherein marking the process as malware comprises halting all file operations of the process.

3. The method according to claim 1, further comprising, when the process triggers all of the primary transformation indicators, marking the process as malware.

4. The method according to claim 3, wherein marking the process as malware comprises halting all file operations of the process.

5. The method according to claim 1, further comprising, when the process triggers all of the primary transformation indicators:
changing the malware detection threshold for the process to a union malware detection value; and
modifying the process malware score by a union indicator adjustment.

6. The method according to claim 1, wherein the set of transformation indicators further comprises secondary transformation indicators including:
a file deletion measurement for the process exceeds a file deletion measurement threshold; and
a file-type change measurement exceeds a file-type change measurement threshold, wherein the file-type change measurement comprises the difference between the number of file-types read and the number of file-types written by the process.

7. The method according to claim 6, further comprising, when the process triggers at least two of the primary transformation indicators and at least one of the secondary transformation indicators, marking the process as malware.

8. The method according to claim 1, wherein the indicator adjustment is associated with a type of the triggered transformation indicator.

9. The method according to claim 1, wherein the total-write-entropy is weighted by a number of written bytes, and wherein the total-read-entropy is weighted by a number of read bytes.

10. The method according to claim 1, wherein the set of transformation indicators further comprises one or more of:
a rate of change measurement exceeding a rate of change threshold;
an aggregate amount of change measurement exceeding an aggregate amount of change threshold; and
a targeting specific file types measurement exceeding a targeting specific file types threshold.

11. A system of detecting malware, the system comprising:
at least one non-transitory computer-readable medium; and
instructions for a malware detector stored on the at least one non-transitory computer-readable medium that, when executed by a processing system, direct the processing system to:
detect and analyze a file operation directed at a file by a system process;
upon determining that the file operation changes a file-type signature of the file, registering a file-type signature transformation indicator for the system process;
upon determining that a similarity measurement of the file is within a similarity measurement range, register a similarity transformation indicator for the system process, wherein the similarity measurement indicates the similarity of data in the file before and after the file operation;
upon determining that an entropy measurement exceeds an entropy measurement threshold, register an entropy transformation indicator for the system process;
modify a system process malware score by an indicator adjustment value for each registered transformation indicator; and
mark the system process as malware when the process malware score reaches a malware detection threshold.

12. The system according to claim 11, wherein marking the system process as malware comprises halting any file operations of the system process.

13. The system according to claim 11, further comprising program instructions stored on the at least one non-transitory computer-readable medium that, when executed by the processing system, direct the processing system to cache file-type signatures of one or more files during an initialization stage of the malware detector.

14. The system according to claim 11, further comprising program instructions stored on the at least one non-transitory computer-readable medium that, when executed by the processing system, direct the processing system to cache similarity-preserving digests of one or more files during an initialization stage of the malware detector.

15. The system according to claim 11, wherein the malware detector comprises a kernel driver of operating system software stored on the at least one non-transitory computer-readable medium.

16. The system according to claim 11, further comprising program instructions stored on the at least one non-transitory computer-readable medium that, when executed by the processing system, direct the processing system to:
store and defer the file operation, in a buffer of the at least one non-transitory computer-readable medium, wherein the buffer is sized to hold file modification operations for a selected number of files for the system process, wherein the file modification operations are stored in first-in-first-out order in the buffer;
commit deferred file modification operations stored in the buffer when the buffer is full; and
dispose of the buffer without committing the deferred file modification operations in the event the system process is marked as malware.

17. The system according to claim 11, wherein the file is a user document file.

* * * * *